(12) United States Patent
Sampath et al.

(10) Patent No.: US 7,864,678 B1
(45) Date of Patent: Jan. 4, 2011

(54) RATE ADAPTATION IN WIRELESS SYSTEMS

(75) Inventors: Hemanth Sampath, Sunnyvale, CA (US); Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 1051 days.

(21) Appl. No.: 10/734,440

(22) Filed: Dec. 11, 2003

Related U.S. Application Data

(60) Provisional application No. 60/494,437, filed on Aug. 12, 2003.

(51) Int. Cl.
*H04B 7/185* (2006.01)

(52) U.S. Cl. ............... 370/232; 370/235; 370/318; 370/465; 455/88; 709/223; 709/335

(58) Field of Classification Search ............... None
See application file for complete search history.

(56) References Cited

U.S. PATENT DOCUMENTS

| | | | |
|---|---|---|---|
| 5,345,599 A | 9/1994 | Paulraj et al. | |
| 5,483,676 A * | 1/1996 | Mahany et al. | 455/67.14 |
| 6,351,499 B1 | 2/2002 | Paulraj et al. | |
| 6,377,636 B1 | 4/2002 | Paulraj et al. | |
| 6,452,981 B1 | 9/2002 | Raleigh et al. | |
| 6,499,008 B2 * | 12/2002 | Miet | 704/200.1 |
| 6,618,591 B1 | 9/2003 | Kalliokulju et al. | |
| 6,633,616 B2 | 10/2003 | Crawford | |
| 6,675,012 B2 | 1/2004 | Gray | |
| 6,687,492 B1 | 2/2004 | Sugar et al. | |
| 6,775,548 B1 * | 8/2004 | Rong et al. | 455/452.2 |
| 6,801,501 B1 * | 10/2004 | Knightly et al. | 370/233 |
| 6,801,580 B2 | 10/2004 | Kadous | |
| 6,826,528 B1 | 11/2004 | Wu et al. | |
| 7,032,157 B2 * | 4/2006 | Kim et al. | 714/758 |
| 7,046,963 B2 | 5/2006 | Luo et al. | |
| 7,075,913 B1 * | 7/2006 | Yavuz et al. | 370/335 |
| 7,302,009 B2 | 11/2007 | Walton et al. | |
| 7,408,976 B1 | 8/2008 | Narasimhan et al. | |
| 7,532,563 B1 | 5/2009 | Shirali et al. | |
| 2002/0056066 A1 | 5/2002 | Gesbert et al. | |
| 2002/0183010 A1 | 12/2002 | Catreux et al. | |
| 2002/0196842 A1 | 12/2002 | Onggosanusi et al. | |

(Continued)

FOREIGN PATENT DOCUMENTS

WO   WO 03/001726   1/2003

OTHER PUBLICATIONS

IEEE Computer Society, "*Information Technology—Telecommunications and Information Exchange Between Systems—Local and Metropolitan Area Networks—Specific Requirements—Part II: Wireless LAN Medium Access Control (MAC)and Physical Layer (PHY) Specifications*", IEEE Std 802.11—First Edition, 1999.

(Continued)

*Primary Examiner*—Chi H. Pham
*Assistant Examiner*—Shick Hom

(57) ABSTRACT

A transceiver in an ad hoc network may use a rate adaptation module to select an optimal data rate for a given wireless environment. The rate adaptation module may use a measured RSSI (Received Signal Strength Indicator) from a receive section and a retry count from a transmit section to determine the optimal data rate.

70 Claims, 5 Drawing Sheets

U.S. PATENT DOCUMENTS

| | | | |
|---|---|---|---|
| 2003/0003863 A1 | 1/2003 | Thielecke et al. | |
| 2003/0065712 A1* | 4/2003 | Cheung et al. | 709/203 |
| 2003/0086486 A1 | 5/2003 | Graziano et al. | |
| 2003/0100265 A1 | 5/2003 | Wang et al. | |
| 2003/0231655 A1 | 12/2003 | Kelton et al. | |
| 2004/0017773 A1* | 1/2004 | Piche et al. | 370/232 |
| 2004/0153951 A1* | 8/2004 | Walker et al. | 714/776 |
| 2004/0160922 A1* | 8/2004 | Nanda et al. | 370/335 |
| 2004/0160979 A1* | 8/2004 | Pepin et al. | 370/462 |
| 2004/0203456 A1 | 10/2004 | Onggosanusi et al. | |
| 2005/0027840 A1* | 2/2005 | Theobold et al. | 709/223 |
| 2005/0099975 A1 | 5/2005 | Catreux et al. | 370/329 |
| 2005/0143027 A1 | 6/2005 | Kiddink et al. | |
| 2005/0249157 A1 | 11/2005 | Qian et al. | |
| 2005/0254592 A1 | 11/2005 | Naguib et al. | |

OTHER PUBLICATIONS

IEEE Computer Society, "*Supplement to IEEE Standard for Information Technology—Telecommunications and Information Exchange Between Systems—Local and Metropolitan Area Networks—Specific Requirements—Part II : Wireless LAN Medium Access Control (MAC) and Physical Layer (PHY) Specifications: High-speed Physical Layer in the 5 GHZ Band*", IEEE Std 802.11a—1999 (Supplement to IEEE Std 802.11—1999).

IEEE Computer Society, "*Supplement to IEEE Standard for Information Technology—Telecommunications and Information Exchange Between Systems—Local and Metropolitan Area Networks—Specific Requirements—Part II : Wireless LAN Medium Access Control (MAC) and Physical Layer (PHY) Specifications: Higher-speed Physical Layer Extension in the 2.4 GHZ Band*", IEEE Std 802.11b—1999 (Supplement to IEEE Std 802.11—1999).

IEEE Computer Society, "*IEEE Standard for Information Technology—DRAFT Supplement to STANDARD [for] Information Technology—Telecommunications and Information Exchange Between Systems—Local and Metropolitan Area Networks—Specific Requirements—Part II: Wireless LAN Medium Access Control (MAC) and Physical Layer (PHY) Specifications: Further Higher Data Rate Extension in the 2.4 GHz Band*", IEEE P802.11g/D8.2, Apr. 2003.

IEEE Computer Society, "*IEEE Standard for Information Technology—Telecommunications and Information Exchange Between Systems—Local and Metropolitan Area Networks—Specific Requirements—Part II: Wireless LAN Medium Access Control (MAC) and Physical Layer (PHY) Specifications: Amendment 5: Spectrum and Transmit Power Management Extensions in the 5 GHz Band in Europe*", IEEE P802.11h—2003.

Goldsmith, et al., "Adaptive Coded Modulation for Fading Channels", May 1998, IEEE Transactions on Communications, vol. 46, No. 5, pp. 595-602.

Catreux, et al., "Adaptive Modulation and MIMO Coding for Broadband Wireless Data Networks", Jun. 2002, IEEE Communications Magazine, pp. 108-115.

Xin, et al., "Space-Time Constellation-Rotating Codes Maximizing Diversity and Coding Gains", 2001, IEEE, pp. 455-459.

Foschini, et al., "On Limits of Wireless Communications in a Fading Environment when Using Multiple Antennas", 1998, Wireless Personal Communications, pp. 311-335.

Tarokh, et al., "Space-Time Block Codes from Orthogonal Designs", Jul. 1999, IEEE Transactions on Information Theory, vol. 45, No. 5, pp. 1456-1467.

IEEE Computer Society, "TGn Sync Proposal Technical Specification", IEEE Std 802.11n—First Edition, May 2005.

IEEE Computer Society, "Part 16: Air Interface for Fixed Broadband Wireless Access Systems", IEEE Std 802.16-2004.

IEEE Computer Society, "Draft 802.20 Permanent Document : System Requirements for IEEE 802.20 Mobile Broadband Wireless Access Systems—Version 14", IEEE 802.20-PD-06, Jul. 2004.

Sampath, et al. U.S. Appl. No. 10/834,745, filed Apr. 28, 2004.

Komyo, U.S. Appl. No. 10/998,838, filed Nov. 12, 2004.

Narasimhan et al., U.S. Appl. No. 10/620,024, filed Jul. 14, 2003.

Shirali et al., "Adaptively Determining a Data Rate of Packetized Information Transmission Over a Wireless Channel", U.S. Appl. No. 10/988,318, filed Nov. 12, 2004, 51 pages.

* cited by examiner

FIG. 3
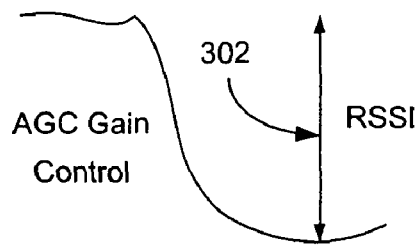
FIG. 4
| Data Rates (Mbps) | $RSSI_{TH}$ (dB) |
|---|---|
| 54 | 36 |
| 48 | 33 |
| 36 | 27 |
| 24 | 22 |
| 12 | 16 |
| 11 | 12 |
| 6 | 10 |
FIG. 5
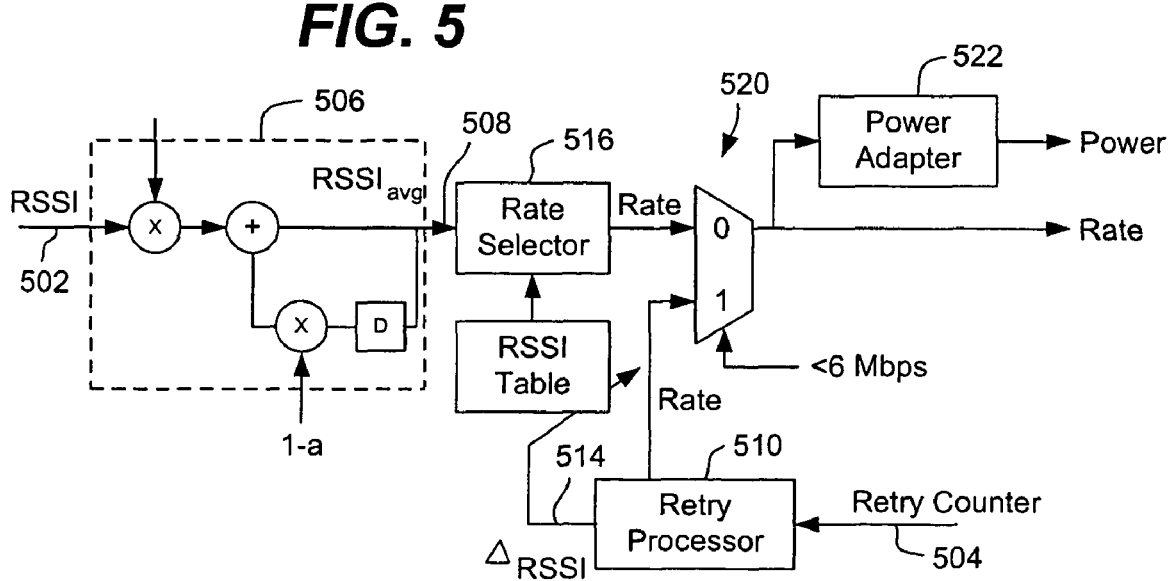

| Data Rates (Mbps) | Confidence (dB) |
|---|---|
| 54 | -10 |
| 48 | -7 |
| 36 | -1 |
| 24 | 4 |
| 12 | 10 |
| 11 | 15 |
| 6 | 20 |

R : Retry Cnt    State = # of consecutive success or failure $\Delta_{RSSI} = \Delta_{RSSI} - \Delta 1$   IF (state == MAX SUCCESS)

$\Delta_{RSSI} = \Delta_{RSSI} + \Delta 2$   IF (state == MAX FAILURE)

RATE ADAPTATION IN WIRELESS SYSTEMS

CROSS-REFERENCE TO RELATED APPLICATIONS

This application claims priority to U.S. Provisional Application Ser. No. 60/494,437, filed on Aug. 12, 2003.

BACKGROUND

The data rate at which a wireless device transmits may depend on the wireless environment in which the device is transmitting. The wireless environment may be affected by such factors as interference, packet collisions, reflections, etc. A wireless device may attempt to select an optimal data rate for a given environment using a data rate selection algorithm.

In the IEEE 802.11 family of specifications, a wireless device initiates transmission at the highest possible data rate. If the wireless device receives an acknowledgement (ACK) from a receiving device, it is assumed that the wireless environment can support the highest data rate and further transmissions occur with this (highest) date rate. Otherwise the data rate is lowered in a step-wise fashion until an ACK is obtained. Such a strategy may waste bandwidth. Furthermore, this strategy can lead to successive packet failures, which may cause TCP timeouts and associated decreases in link throughput.

SUMMARY

A transceiver may include a transmit section operative to transmit packets, a receive section operative to receive packets, and a rate selector operative to select a data rate for transmission. The rate selector may select the data rate based upon a received signal quality value determined by the receive section and a packet loss indicator value determined by the transmit section. The received signal quality value may be, e.g., an RSSI (Received Signal Strength Indicator) value, an SNR (signal to noise ratio) value, an SINR (signal to interference noise ratio) value, or a SQM (signal quality measure, which is the mean (geometric, arithmetic, or other) of the SNRs across all tones). The packet loss indicator value may be, e.g., a retry counter value, a bit-error update value, a packet error update value, a symbol error update value, or a CRC (Cyclic Redundancy Check) indicator value.

The rate selector may include a table including available data rates, each associated with a nominal received signal quality value. The rate selector may generate a confidence value for each available data rate using the received signal quality value and the packet loss indicator value. In an embodiment using RSSI for the signal quality value and a retry counter for the packet loss indicator value, the confidence value is obtained by solving the equation:

$$\text{Confidence}[j] = \text{RSSI}_{avg} - \text{RSSI}_{TH}[j] - \Delta_{RSSI},$$

where $\text{RSSI}_{TH}[j]$ comprises a nominal received signal strength value associated with a data rate [j] in a table. The rate selector then selects a data rate associated with a positive confidence value, in an embodiment, the lowest positive confidence value.

The rate selector may include a state machine that monitors the packet loss indicator value and determines whether a current data rate causes an excessive number of failed packet transmissions or an excessive number of successful packet transmissions, and updates an adjustment value for the signal quality value accordingly.

The transceiver selector may include a power adaptor that increases a transmit power of the transmit section in response to the selected data rate falling below a minimum threshold data rate and decreases the transmit power in response to the selected data rate exceeding a maximum threshold data rate.

The rate selector may include a hardware section that progressively decreases the data rate in response to the packet loss indicator value increasing until a "successful" data rate is achieved.

The rate selector may select a data rate value directly from the packet loss indicator value in response to the received signal quality value falling below a minimum signal quality value.

The transceiver may be used in a wireless LAN system that complies with one of the IEEE 802.11 family of specifications.

BRIEF DESCRIPTION OF THE DRAWINGS

FIG. 3 is a plot illustrating an RSSI (Received Signal Strength Indicator) measurement.

FIG. 4 shows a nominal RSSI table.

FIG. 5 is a block diagram of a rate adaptation module.

DETAILED DESCRIPTION

Figure 1:
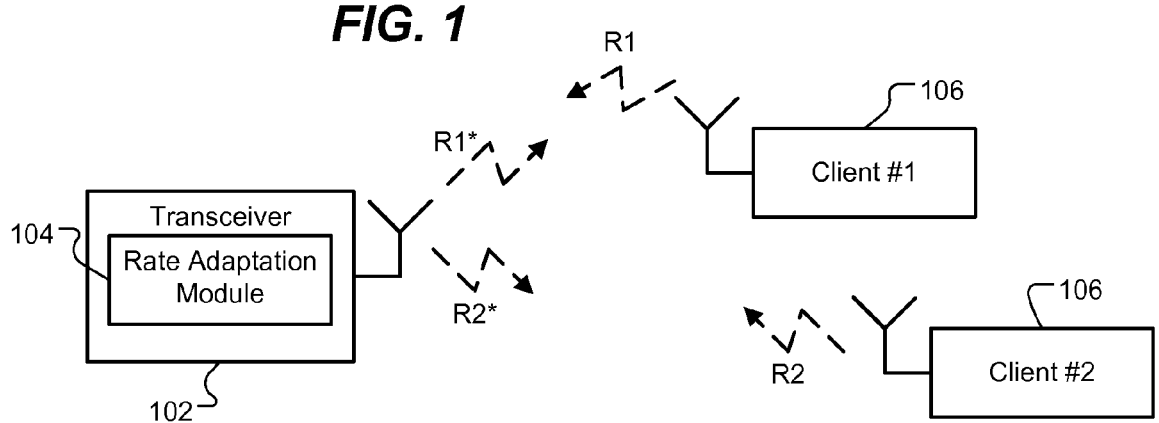
FIG. 1 is a block diagram of a wireless system.

FIG. 1 shows a wireless system. The system may be an ad hoc network of wireless devices, e.g., a wireless Local Area Network (WLAN) that complies with one of the IEEE 802.11 family of specifications. The system may include a wireless transceiver 102 with a rate adaptation module 104 and one or more wireless client transceivers 106.

The transceiver 102 may communicate with a client transceiver 106 on an uplink channel (client transmitting to transceiver) and on a downlink channel (transceiver transmitting to client). The data rates in the uplink and downlink channels depend on the characteristics of the wireless environment and may differ from each other.

In an embodiment, the transceiver 102 may use a rate adaptation scheme to optimize a data rate in communicating with the client transceivers 106. For a given data rate, throughput depends on the wireless environment, which may be affected by, e.g., interference, packet collisions, multipath fading, and implementation losses. The transceiver may select a physical (PHY) layer data rate based on the wireless channel qualities of the uplink and downlink to maximize average throughput.

Figure 2:
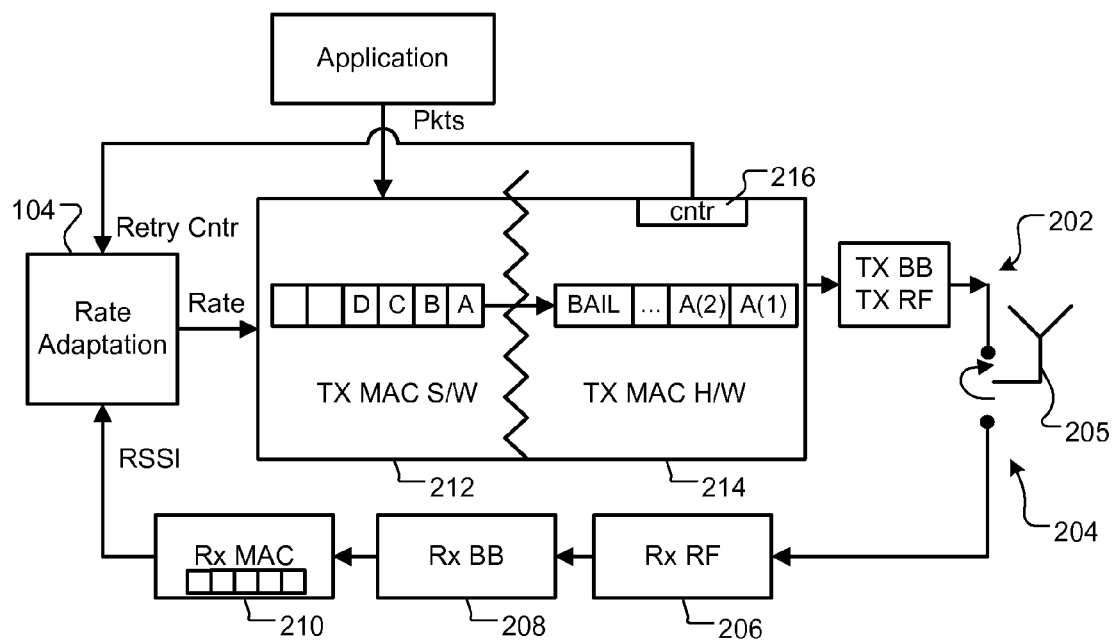
FIG. 2 is a block diagram of a transceiver with a rate adaptation module.

FIG. 2 shows a schematic of a transceiver according to an embodiment. The transceiver may have a transmit section 202 and a receive section 204. The rate adaptation module 104 may use packet loss data from the transmit section 202 and a signal quality measure from the receive section 204 to determine a suitable data rate for transmission in a given wireless environment.

In an embodiment, the signal quality measure is the RSSI (Received Signal Strength Indicator). In alternative embodiments, other signal quality measures, such as SNR (signal to noise ratio), SINR (signal to interference noise ratio), SQM (signal quality measure, which is the mean (geometric, arithmetic, or other) of the SNRs across all OFDM tones), etc., may be used.

The RSSI (or other signal quality measure) may be determined from successfully received packets, i.e., those packets received at the antenna 205 and processed by the RF (radio frequency) section 206, baseband section 208, and MAC (Media Access Control) section 210. RSSI corresponds to a drop 302 in the AGC for a successfully received packet, as shown in FIG. 3. The magnitude of the drop in AGC depends on the strength of the signal on which the packet is received. A higher RSSI indicates a "better" channel, which may supeach retry of a packet to be sent, and the retry counter value provided to the rate adaptation module 104.

In an embodiment, the hardware section can be designed so that successive "retried" packets (e.g., A(1), A(2), are sent at progressively lower rates until a "successful" transmission. The'retry counter 216 may be incremented on each retry of a packet to be sent, and the retry counter value provided to the rate adaptation module 104. Such a feature allows successful packet transmission, while the rate adaptation algorithm can adapt to the changing environment (on a slower time scale, depending upon the retry counter). The following table provides an exemplary relationship between data rates transmitted vs. retry counter value.

| | HARDWARE PACKET RETRY TABLE | | | | | | | | |
|---|---|---|---|---|---|---|---|---|---|
| Index | Retry Count = 0 (Mbps) | Retry Count = 1 (Mbps) | Retry Count = 2 (Mbps) | Retry Count = 3 (Mbps) | Retry Count = 4 (Mbps) | Retry Count = 5 (Mbps) | Retry Count = 6 (Mbps) | Retry Count = 7 (Mbps) | Retry Count = 8 (Mbps) |
| 13 | 72 | 72 | 54 | 48 | 36 | 24 | 12 | 6 | 1 |
| 12 | 54 | 54 | 48 | 36 | 24 | 12 | 6 | 2 | 1 |
| 11 | 48 | 48 | 36 | 24 | 12 | 6 | 2 | 1 | 1 |
| 10 | 36 | 36 | 24 | 12 | 6 | 2 | 1 | 1 | 1 |
| 9 | 24 | 24 | 12 | 6 | 2 | 1 | 1 | 1 | 1 |
| 8 | 18 | 18 | 12 | 6 | 2 | 1 | 1 | 1 | 1 |
| 7 | 12 | 12 | 6 | 2 | 1 | 1 | 1 | 1 | 1 |
| 6 | 9 | 9 | 6 | 2 | 1 | 1 | 1 | 1 | 1 |
| 5 | 6 | 6 | 2 | 1 | 1 | 1 | 1 | 1 | 1 |
| 4 | 22 | 22 | 11 | 5.5 | 2 | 1 | 1 | 1 | 1 |
| 3 | 11 | 11 | 5.5 | 2 | 1 | 1 | 1 | 1 | 1 |
| 2 | 5.5 | 5.5 | 2 | 1 | 1 | 1 | 1 | 1 | 1 |
| 1 | 2 | 2 | 1 | 1 | 1 | 1 | 1 | 1 | 1 |
| 0 | 1 | 1 | 1 | 1 | 1 | 1 | 1 | 1 | 1 | port higher data rates. In an embodiment, the RSSI measurement has a measurement error corresponding to the AGC step height, e.g., +/−2 dB, and may be reliable above approximately 5 dB.

The RSSI may be used to construct a nominal RSSI table which may be adapted on a per-client basis. Depending on the complexity of implementation, multiple RSSI tables can also be maintained, which may be indexed by "packet size" (e.g., 64 bytes, 1500 bytes, etc.), "wireless environment" (e.g., home, outdoors, stadium, enterprise, etc.), etc. In other words, for different applications and environments, different tables can be used.

FIG. 4 shows an exemplary nominal RSSI table.

A data rate may be selected based on a measured RSSI. For example, in this table, an RSSI of 34 (or any other value between 33 and <36) would indicate a channel quality capable of supporting a data rate of 48 Mbps.

The rate adaptation module 104 may receive a packet loss indicator from the transmit section. In an embodiment, the packet loss indicator is a retry counter value. In alternative embodiments, other packet loss indicators, such as bit-error update, packet error update, symbol error update, CRC (Cyclic Redundancy Check) indicators, etc., may be used.

Packets (e.g., A, B, C, D) may be queued in a software portion 212 of the transmit section, and copies of a packet to be sent (e.g., A(1), A(2), may be queued in a hardware portion 214 of the transmit section. A packet may need to be resent, or "retried", until an acknowledgment (ACK) signal signifying a successful transmission of the packet is received from the receiving client. A retry counter 216 may be incremented on For example, let the data rate as predicted by the rate adaptation algorithm be 54 Mbps (2nd row of the table). If this packet is retried, the first transmission occurs at 54 Mbps, the next transmission occurs at 48 Mbps, the next at 36 Mbps, and so on until the packet is successfully transmitted.

The number of retries for a given packet may depend on the quality of the channel. A higher number of retries may indicate a "worse" channel, which may only support lower data rates. The transmit section may only retry the packet up to a maximum number. If the maximum retry count is achieved, the retry counter may signal a bailout ("BAIL"), in which case, the transmit section may drop the data rate for transmission to a lowest possible rate.

FIG. 5 is a schematic diagram of a rate adaptation module according to an embodiment. The rate adaptation module receives two inputs; an RSSI value 502 from the receive section, and a retry counter value 504 from the transmit section. A filter 506 may be used to determine an average RSSI value ($RSSI_{avg}$) 508 from the input RSSI 502, which may minimize noise effects and provide a more stable measurement. A retry processor 510 may use the input retry counter value to calibrate the average RSSI value, with) a $\Delta_{RSSI}$ 514 measurement The $\Delta_{RSSI}$ is an adjustment to the average RSSI value due to differences in transmit/receive vendor boards, differences in transmit and receive wireless environment, or power and/or link imbalances between transmission and reception of data packets.

A rate selector 516 may use the $RSSI_{avg}$ value 508, the $\Delta_{RSSI}$ value 514, and the $RRSI_{TH}$ values in a nominal table (such as that shown in FIG. 4) to form a confidence value. The confidence value may be given by:

$$\text{Confidence}[j] = \text{RSSI}_{avg} - \text{RSSI}_{TH}[j] - \Delta_{RSSI} \quad 1 \leq j \leq 54$$

Figures 6, 7:
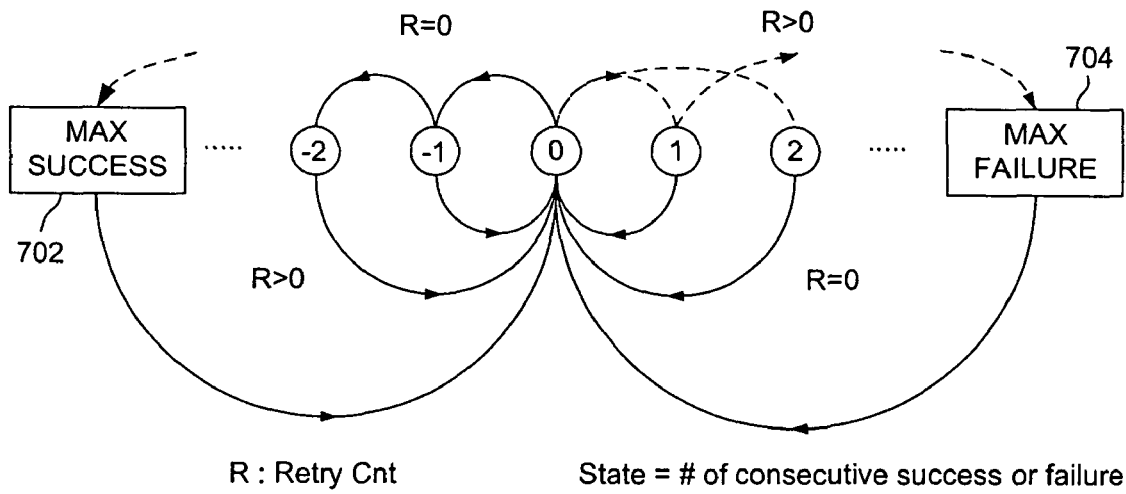
FIG. 6 shows an adjusted RSSI table.
FIG. 7 shows a state machine in a retry processor.

FIG. 6 shows an example for a measured $\text{RSSI}_{avg}$ of 24 dB and $\Delta_{RSSI}$ of −2 dB. A positive confidence value indicates a data rate that can be supported by the channel quality and a negative confidence value indicates a data rate that cannot be supported by the channel quality. An optimal data rate may be selected by selecting the highest data rate in the table with a positive confidence value, i.e., $$\text{Rate} = \text{argmin}(j)\{\text{RSSI}_{avg} - \text{RSSI}_{TH}[j] - \Delta_{RSSI}\}+$$

In this example, the rate selector may select a data rate of 24 Mbps, the highest data rate with a positive confidence value. This may maximize throughput while maintaining reliable link quality.

Although FIG. 6 shows an adjusted RSSI table including confidence values calculated for all data rates, in an embodiment the rate selector 516 may only calculate confidence values for data rates in the table adjacent to the data rate corresponding to the measured $\text{RSSI}_{avg}$ value, e.g., 38 Mbps and 12 Mbps in FIG. 6.

The retry processor may include a state machine, such as that shown in FIG. 7. The state machine may be used to determine whether the adjusted table is too optimistic (i.e., data rate is too high for the conditions) or too pessimistic (i.e., data rate is too low for the conditions). The state machine may track the number of successful (R=0) and unsuccessful (R>0) packet transmissions. Too many successive packet transmissions packets without retry may suggest that the adjusted table is too pessimistic, and too many successive transmissions with retry values greater than zero may suggest that the adjusted table is too optimistic. The retry processor may use this information to adjust the $\Delta_{RSSI}$ up or down. The adjustment in $\Delta_{RSSI}$ may change the confidence values in the adjusted table and possibly the data rate. However, a change in $\Delta_{RSSI}$ will not necessarily result in a change in data rate.

The retry processor 516 may start at state 0. If the retry counter returns a retry count of zero, i.e., the packet is transmitted successfully without retry, the state machine may move to from state 0 to state −1. If the next packet is not successfully sent (i.e., R>0), the state machine may return to state 0. Alternatively, if the next packet is successfully sent without retry, the machine may move from state −1 to state −2. Successive successful transmissions without retries may move the state machine to a maximum success state 702. If the state machine reaches this state, it is assumed that the table is too pessimistic and must be adjusted. In this case, $\Delta_{RSSI}$ may be adjusted to a value $\Delta_{RSSI} - \Delta_1$, where $\Delta_1$ is a pre-selected adjustment value.

From state 0, if the retry counter returns a value greater than zero (indicating a packet was resent), the state machine may move from state 0 to state 1. If packet is successfully sent in the next retry, the state machine may return to state 0. Alternatively, if the packet is retried again, the state machine may move to state 2. The state machine may move to progressively higher states as the same packet, or the next packet, is repeatedly retried. This may continue up until a maximum failure state 704. If the state machine reaches this state, it is assumed that the table is too optimistic and must be adjusted. In this case, $\Delta_{RSSI}$ may be adjusted to a value of $\Delta_{RSSI} + \Delta_2$, where $\Delta_2$ is a pre-selected adjustment value.

The state machine may be modified from that shown in FIG. 7 in alternative embodiments. For example, from state 0, if the retry counter returns a value N greater than zero (indicating a packet was resent), the state machine may move from state 0 to state N. If packet is successfully sent in the next retry, the state machine may go to state N−1. Alternatively, if the packet is retried again, the state machine may move to state N+1.

The values of $\Delta_1$ and $\Delta_2$ may be programmable in software. For example, in an embodiment, the following values were used: $\Delta_1$=0.5 dB, MAX SUCCESS=3; and $\Delta_2$=1 dB, MAX FAILURE=2.

Other measures of packet loss may be used in the state machine, such as bit-error, packet error, symbol error, CRC failures, etc.

In normal operation, the adjusted RSSI (or other signal quality measure) table may be matched to the environment. Sporadic failures may occur due to additive white Gaussian noise (AWGN), phase noise, scrambler effects, collision, or interference, but typically, the conditions will require the $\Delta_{RSSI}$ be adjusted only rarely or in both directions, thereby canceling the adjustments out. Repeated successes or failures may indicate that the RSSI table is not matched to the environment and may lead to $\Delta_{RSSI}$ updates. However, as stated above, a change in $\Delta_{RSSI}$ will not necessarily result in a change in data rate. Multiple $\Delta_{RSSI}$ updates are typically required to actually change rates. The updates may merely change the confidence factors.

Figure 8A:
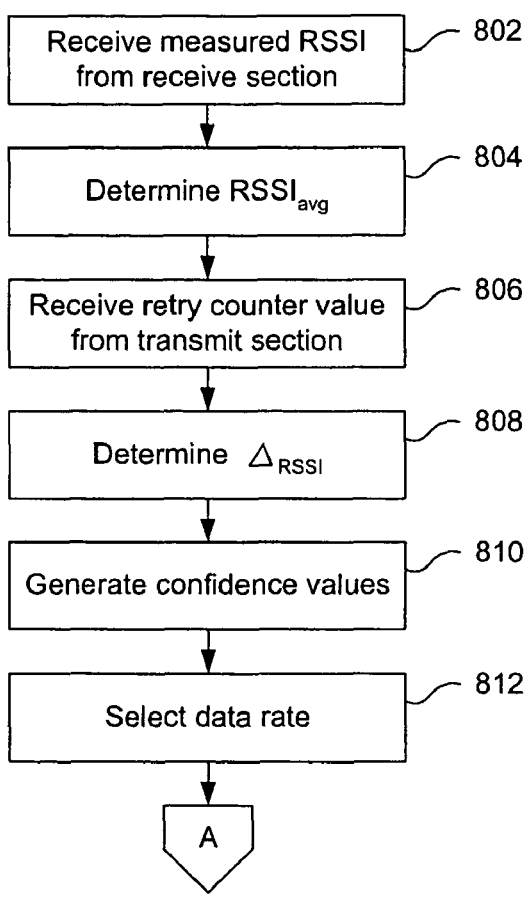
FIGS. 8A and 8B show a flowchart describing a rate adaptation algorithm.
Figure 8B:
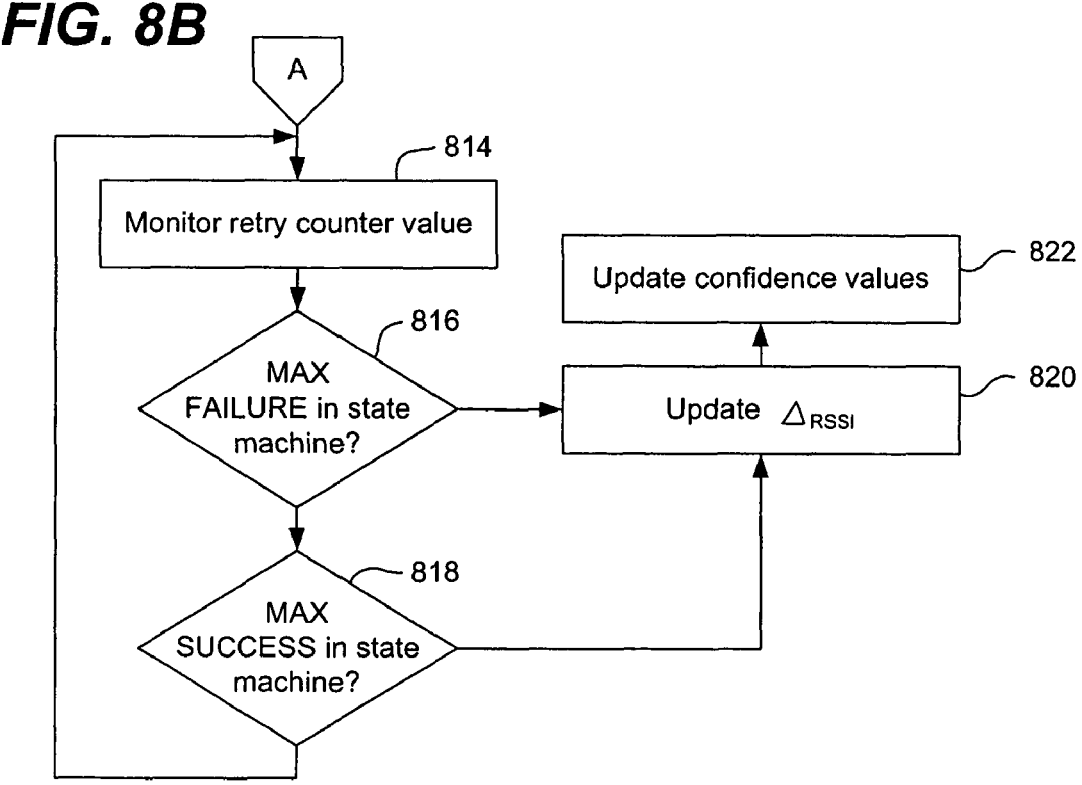

FIGS. 8A and 8B show a flowchart describing an exemplary rate adaptation algorithm. The rate adaptation module receives a measured RSSI value from the receive section (block 802) and determines $\text{RSSI}_{avg}$ using the filter 506 (block 804). The rate adaptation module receives the retry counter value from the transmit section (block 806) and determines a $\Delta_{RSSI}$ value (block 808). The rate adaptation generates confidence values corresponding to different data rates using the RSSIavg value, $\Delta_{RSSI}$ value, and $\text{RSSI}_{TH}$ values in a nominal RSSI table (block 810). The rate adaptation module may then select a data rate having the lowest positive confidence value (block 812). The rate adaptation module may continue to monitor the retry counter value (block 814). If the retry counter value causes the state machine (FIG. 7) to reach a maximum failure value (block 816) or a maximum success value (block 818), the rate adaptation module may update the $\Delta_{RSSI}$ value (block 820) and the confidence values (block 822).

Figure 9A:
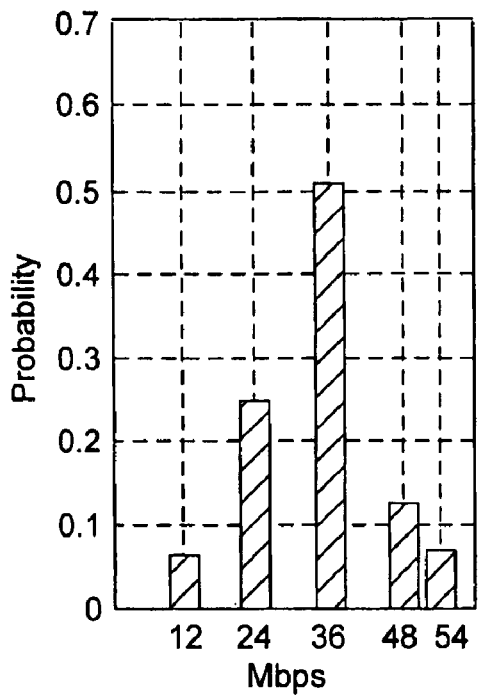
FIGS. 9A and 9B show results from two experiments using transceivers with a rate adaptation module.
Figure 9B:
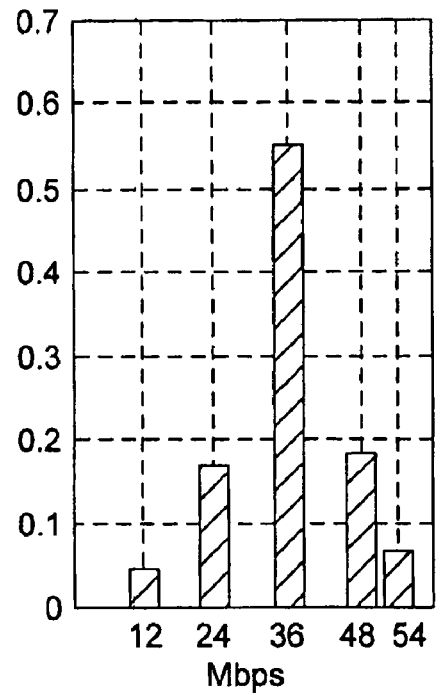

FIGS. 9A and 9B are plots showing the results of two experiments conducted to test the rate adaptation algorithm. Both tests used a transceiver in a cubicle, with a client receiver 45 feet away and transmissions on channel 11. The first test simulates an office environment, with a mean $\Delta_{RSSI}$ of 3.15 dB. In this scenario, the rate adaptation module selected a data rate of 36 Mbps over 50% of the time. In the second experiment, a bias of 6 dB was applied to simulate a different environment, with a resulting mean $\Delta_{RSSI}$ of 9.27 dB. In this scenario, the rate adaptation module also selected a data rate of 36 Mbps over 50% of the time.

In an embodiment, the rate adaptation module may include a switch 520 (FIG. 5), which may select the output of the retry processor 510 over the output of the rate selector 516 if the data rate falls below a minimum data rate, e.g., 6 Mbps, below which the RSSI measurement may not be accurate.

Figure 10:
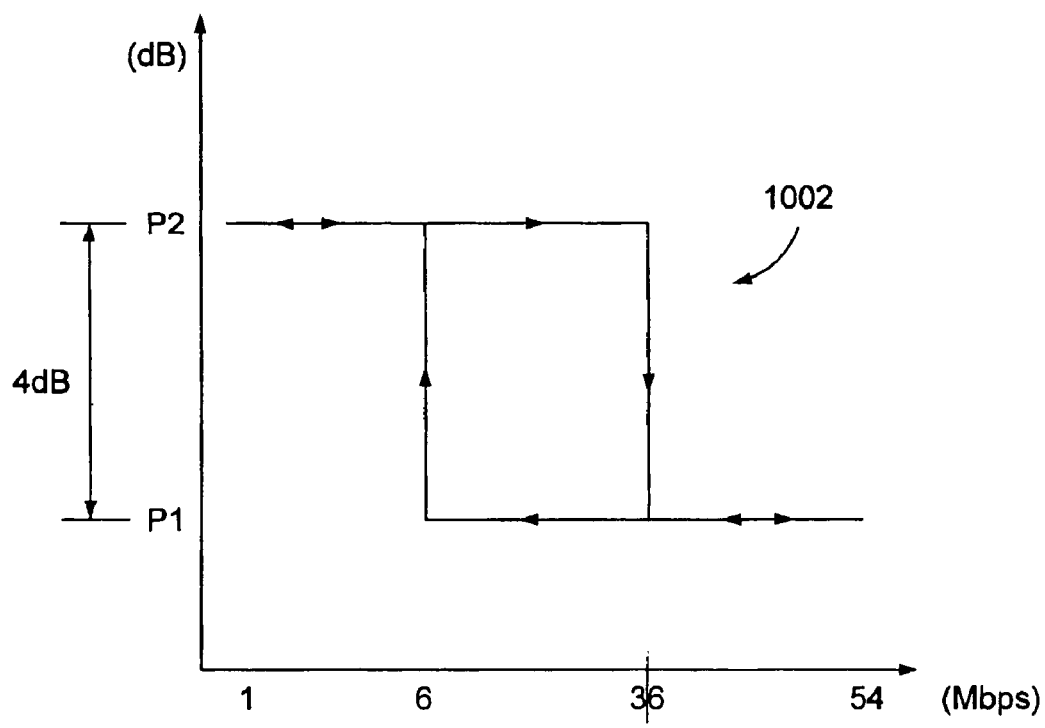
FIG. 10 is a plot illustrating a the response of a power adapter in the transceiver.

In an embodiment, the rate adaptation module may include a power adaptor 522. FIG. 10 is a graph showing the response of the power adaptor for different data rates. The power may be increased for lower data rates to account for presumed low link quality. The power may be reduced for high data rates for presumed good link quality. The response may include a hysteresis loop 1002 to prevent too frequent changes in power, e.g., due to the user walking away from an access point. The power adaptor 522 may be used to improve range for low data rates and reduce power amplifier non-linearity at high data rates.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method performed by at least one device of a communication system, the method comprising:
   determining a signal quality value from received packets transmitted at a first data transmission rate;
   determining a packet loss indicator value from transmitted packets transmitted at a second different data transmission rate;
   selecting a third different data transmission rate in response to the signal quality value determined from the received packets transmitted at the first data transmission rate and the packet loss indicator value determined from the transmitted packets transmitted at the second different data transmission rate, wherein the selecting includes selecting the third different data transmission rate from a plurality of available data transmission rates, and each of the plurality of available data transmission rates is different from the first data transmission rate and the second different data transmission rate;
   transmitting packets at the third different data transmission rate; and
   generating a confidence value for each of a plurality of available data transmission rates using the signal quality value and the packet loss indicator value.

2. The method of claim 1, wherein the signal quality value is selected from an RSSI (Received Signal Strength Indicator) value, an SNR (signal to noise ratio) value, an SINR (signal to interference noise ratio) value, and a SQM (signal quality measure) value, the SQM value comprising a mean of the SNRs across all of a plurality of tones.

3. The method of claim 1, wherein the packet loss indicator value is selected from a retry counter value, a bit-error update value, a packet error update value, a symbol error update value, and a CRC (Cyclic Redundancy Check) indicator value.

4. The method of claim 1, further comprising:
   generating an adjustment value for the signal quality value from the packet loss indicator value.

5. The method of claim 4, wherein the signal quality value comprises an RSSI value.

6. The method of claim 5, further comprising:
   generating an average received signal strength indicator ($RSSI_{avg}$) value, and
   wherein the adjustment value comprises a $\Delta_{RSSI}$ value, the $\Delta_{RSSI}$ value comprising an adjustment to the $RSSI_{avg}$ value.

7. The method of claim 6, wherein said generating the confidence value comprises solving the equation:

$$\text{Confidence}[j] = RSSI_{avg} - RSSI_{TH}[j] - \Delta_{RSSI},$$

where $RSSI_{TH}[j]$ comprises a nominal received signal strength value associated with a data transmission rate [j] in a table.

8. The method of claim 7, wherein said selecting the third different data transmission rate comprises selecting a data transmission rate associated with a positive confidence value.

9. The method of claim 7, wherein said selecting the third different data transmission rate comprises selecting a data transmission rate associated with a lowest positive confidence value.

10. The method of claim 4, further comprising:
    updating the adjustment value in response to the packet loss indicator value indicating a maximum failure value corresponding to an excessive number of failed packet transmissions.

11. The method of claim 4, further comprising:
    updating the adjustment value in response to the packet loss indicator value indicating a maximum success value corresponding to an excessive number of success packet transmissions.

12. The method of claim 1, further comprising:
    increasing a transmit power for transmitting packets in response to the selected data transmission rate falling below a first threshold data transmission rate; and
    decreasing the transmit power in response to the selected data transmission rate exceeding a second threshold data transmission rate.

13. The method of claim 12, wherein the second threshold data transmission rate is greater than the first threshold data transmission rate.

14. The method of claim 1, further comprising:
    decreasing the selected data transmission rate in response to the packet loss indicator value increasing.

15. The method of claim 14, wherein said decreasing comprises decreasing the selected data transmission rate in response to data transmission rate values in a table indexed by available data transmission rates and packet loss indicator values.

16. The method of claim 1, further comprising:
    selecting a fourth data transmission rate value directly from the packet loss indicator value in response to the signal quality value falling below a minimum signal quality value.

17. An apparatus comprising:
    a transceiver including:
      a transmit section operative to transmit packets at a first data transmission rate and to determine a packet loss indicator value;
      a receive section operative to receive packets at a second different data transmission rate and to determine a signal quality value from said received packets; and
      a rate selector operative to select a third different data transmission rate in response to the signal quality value determined from the packets received at the second different data transmission rate and the packet loss indicator value determined from the packets transmitted at the first data transmission rate, wherein the rate selector selects the third different data transmission rate from a plurality of available data transmission rates, and each of the plurality of available data transmission rates is different from the first data transmission rate and the second different data transmission rate, wherein the rate selector is further operative to generate a confidence value for each of a plurality of available data transmission rates using the signal quality value and the packet loss indicator value.

18. The apparatus of claim 17, wherein the signal quality value is selected from an RSSI (Received Signal Strength Indicator) value, an SNR (signal to noise ratio) value, an SINR (signal to interference noise ratio) value, and a SQM (signal quality measure) value, the SQM value comprising a mean of the SNRs across all of a plurality of tones.

19. The apparatus of claim 17, wherein the packet loss indicator value is selected from a retry counter value, a bit-error update value, a packet error update value, a symbol error update value, and a CRC (Cyclic Redundancy Check) indicator value.

20. The apparatus of claim 17, further comprising:
a table including the plurality of available data transmission rates, each available data transmission rate associated with a nominal signal quality value.

21. The apparatus of claim 17, further comprising:
a retry processor operative to generate an adjustment value for the signal quality value from the packet loss indicator value.

22. The apparatus of claim 21, wherein the signal quality value comprises an RSSI value.

23. The apparatus of claim 22, further comprising a filter to generate an average received signal strength indicator ($RSSI_{avg}$) value, and
wherein the adjustment value comprises a $\Delta_{RSSI}$ value, the $\Delta_{RSSI}$ value comprising an adjustment to the $RSSI_{avg}$ value.

24. The apparatus of claim 23, wherein the rate selector is further operative to generate the confidence value by solving the equation:

$$\text{Confidence}[j] = RSSI_{avg} - RSSI_{TH}[j] - \Delta_{RSSI},$$

where $RSSI_{TH}[j]$ comprises a nominal received signal strength value associated with a data transmission rate [j] in a table.

25. The apparatus of claim 24, wherein the rate selector is operative to select a third different data transmission rate associated with a positive confidence value.

26. The apparatus of claim 24, wherein the rate selector is operative to select a third different data transmission rate associated with a lowest positive confidence value.

27. The apparatus of claim 21, further comprising a state machine operative to monitor the packet loss indicator value and determine whether a current data transmission rate causes an excessive number of failed packet transmissions or an excessive number of successful packet transmissions.

28. The apparatus of claim 27, wherein the rate selector is further operative to update the adjustment value in response to an output of the state machine indicating that the current data transmission rate causes an excessive number of failed packet transmissions or an excessive number of successful packet transmissions.

29. The apparatus of claim 17, further comprising:
a power adaptor operative to increasing a transmit power of the transmit section in response to the selected data transmission rate falling below a first threshold data transmission rate and to decrease the transmit power in response to the selected data transmission rate exceeding a second threshold data transmission rate.

30. The apparatus of claim 29, wherein the second threshold data transmission rate is greater than the first threshold data transmission rate.

31. The apparatus of claim 17, wherein the rate selector is further operative to decrease the selected data transmission rate in response to the packet loss indicator value increasing.

32. The apparatus of claim 31, further comprising a table indexed by available data transmission rates and packet loss indicator values, and
wherein the rate selector is operative to decrease the selected data transmission rate in response to data transmission rate values in said table.

33. The apparatus of claim 17, wherein the rate selector is further operative to select a fourth data transmission rate value directly from the packet loss indicator value in response to the signal quality value falling below a minimum signal quality value.

34. An apparatus comprising:
a transceiver including:
a transmit section including:
means for transmitting packets at a first data transmission rate, and
means for determining a packet loss indicator value from the transmitted packets; and
a receive section including:
means for receiving packets at a second different data transmission rate, and
means for determining a signal quality value from the received packets;
means for selecting a third different data transmission rate in response to the signal quality value determined from the received packets received at the second different data transmission rate and the packet loss indicator value determined from the transmitted packets transmitted at the first data transmission rate, wherein the selecting includes selecting the third different data transmission rate from a plurality of available data transmission rates, and each of the plurality of available data transmission rates is different from the first data transmission rate and the second different data transmission rate; and
means for generating a confidence value for each of a plurality of available data transmission rates using the signal quality value and the packet loss indicator value.

35. The apparatus of claim 34, wherein the signal quality value is selected from an RSSI (Received Signal Strength Indicator) value, an SNR (signal to noise ratio) value, an SINR (signal to interference noise ratio) value, and a SQM (signal quality measure) value, the SQM value comprising a mean of the SNRs across all of a plurality of tones.

36. The apparatus of claim 34, wherein the packet loss indicator value is selected from a retry counter value, a bit-error update value, a packet error update value, a symbol error update value, and a CRC (Cyclic Redundancy Check) indicator value.

37. The apparatus of claim 34, further comprising:
a table including the plurality of available data transmission rates, each available data transmission rate associated with a nominal signal quality value.

38. The apparatus of claim 34, further comprising:
means for generating an adjustment value for the signal quality value from the packet loss indicator value.

39. The apparatus of claim 38, wherein the signal quality value comprises an RSSI value.

40. The apparatus of claim 39, further comprising:
means for generating an average received signal strength indicator ($RSSI_{avg}$) value, and
wherein the adjustment value comprises a $\Delta_{RSSI}$ value, the $\Delta_{RSSI}$ value comprising an adjustment to the $RSSI_{avg}$ value.

41. The apparatus of claim 40, further comprising:
means for generating the confidence value by solving the equation:

$$\text{Confidence}[j] = RSSI_{avg} - RSSI_{TH}[j] - \Delta_{RSSI},$$

where $RSSI_{TH}[j]$ comprises a nominal received signal strength value associated with a data transmission rate [j] in a table.

42. The apparatus of claim 41, further comprising:
means for selecting a third different data transmission rate associated with a positive confidence value.

43. The apparatus of claim 41, further comprising:
means for selecting a third different data transmission rate associated with a lowest positive confidence value.

44. The apparatus of claim 38, further comprising:
means for monitoring the packet loss indicator value; and
means for determining whether a current data transmission rate causes an excessive number of failed packet transmissions or an excessive number of successful packet transmissions.

45. The apparatus of claim 34, further comprising:
means for updating the adjustment value in response to the current data transmission rate causing an excessive number of failed packet transmissions or an excessive number of successful packet transmissions.

46. The apparatus of claim 34, further comprising:
means for increasing a transmit power of the transmit section in response to the selected data transmission rate falling below a first threshold data transmission rate and to decrease the transmit power in response to the selected data transmission rate exceeding a second threshold data transmission rate.

47. The apparatus of claim 46, wherein the second threshold data transmission rate is greater than the first threshold data transmission rate.

48. The apparatus of claim 34, further comprising:
means for decreasing the selected data transmission rate in response to the packet loss indicator value increasing.

49. The apparatus of claim 48, further comprising:
a table indexed by available data transmission rates and packet loss indicator values; and
means for decreasing the selected data transmission rate in response to data transmission rate values in said table.

50. The apparatus of claim 34, further comprising:
selecting a fourth data transmission rate value directly from the packet loss indicator value in response to the signal quality value falling below a minimum signal quality value.

51. A non-transitory computer-readable medium having instructions stored thereon, which, when executed by a processor, causes the processor to perform operations comprising:
determining a signal quality value from received packets transmitted at a first data transmission rate;
determining a packet loss indicator value from transmitted packets transmitted at a second different data transmission rate;
selecting a third different data transmission rate in response to the signal quality value determined from the received packets transmitted at the first data transmission rate and the packet loss indicator value determined from the transmitted packets transmitted at the second different data transmission rate, wherein the selecting includes selecting the third different data transmission rate from a plurality of available data transmission rates, and each of the plurality of available data transmission rates is different from the first data transmission rate and the second different data transmission rate;
transmitting packets at the third different data transmission rate; and
generating a confidence value for each of a plurality of available data transmission rates using the signal quality value and the packet loss indicator value.

52. The computer-readable medium of claim 51 wherein the signal quality value is selected from an RSSI (Received Signal Strength Indicator) value, an SNR (signal to noise ratio) value, an SINR (signal to interference noise ratio) value, and a SQM (signal quality measure) value, the SQM value comprising a mean of the SNRs across all of a plurality of tones.

53. The computer-readable medium of claim 51, wherein the packet loss indicator value is selected from a retry counter value, a bit-error update value, a packet error update value, a symbol error update value, and a CRC (Cyclic Redundancy Check) indicator value.

54. The computer-readable medium of claim 51, further comprising:
generating an adjustment value for the signal quality value from the packet loss indicator value.

55. The computer-readable medium of claim 54, wherein the signal quality value comprises an RSSI value.

56. The computer-readable medium of claim 55, further comprising:
generating an average received signal strength indicator ($RSSI_{avg}$) value, and
wherein the adjustment value comprises a $\Delta_{RSSI}$ value, the $\Delta_{RSSI}$ value comprising an adjustment to the $RSSI_{avg}$ value.

57. The computer-readable medium of claim 56, wherein said generating the confidence value comprises solving the equation:

$$\text{Confidence}[j]=RSSI_{avg}-RSSI_{TH}[j]-\Delta_{RSSI},$$

where $RSSI_{TH}[j]$ comprises a nominal received signal strength value associated with a data transmission rate [j] in a table.

58. The computer-readable medium of claim 57 wherein said selecting the third different data transmission rate comprises selecting a data transmission rate associated with a positive confidence value.

59. The computer-readable medium of claim 57, wherein said selecting the third different data transmission rate comprises selecting a data transmission rate associated with a lowest positive confidence value.

60. The computer-readable medium of claim 54, further comprising:
updating the adjustment value in response to the packet loss indicator value indicating a maximum failure value corresponding to an excessive number of failed packet transmissions.

61. The computer-readable medium of claim 54, further comprising:
updating the adjustment value in response to the packet loss indicator value indicating a maximum success value corresponding to an excessive number of success packet transmissions.

62. The computer-readable medium of claim 51, further comprising:
increasing a transmit power for transmitting packets in response to the selected data transmission rate falling below a first threshold data transmission rate; and
decreasing the transmit power in response to the selected data transmission rate exceeding a second threshold data transmission rate.

63. The computer-readable medium of claim 62, wherein the second threshold data transmission rate is greater than the first threshold data transmission rate.

64. The computer-readable medium of claim 51, further comprising:
decreasing the selected data transmission rate in response to the packet loss indicator value increasing.

65. The computer-readable medium of claim 64, wherein said decreasing comprises decreasing the selected data transmission rate in response to data transmission rate values in a table indexed by available data transmission rates and packet loss indicator values.

66. The computer-readable medium of claim 51, further comprising:
selecting a fourth data transmission rate value directly from the packet loss indicator value in response to the signal quality value falling below a minimum signal quality value.

67. The method of claim 1, wherein the transmitted packets and received packets comply with one of the IEEE 802.11 family of specifications.

68. The apparatus of claim 17, wherein the packets are transmitted and received in compliance with one of the IEEE 802.11 family of specifications.

69. The apparatus of claim 34, wherein the packets are transmitted and received in compliance with one of the IEEE 802.11 family of specifications.

70. The computer-readable medium of claim 51, wherein the transmitted packets and received packets comply with one of the IEEE 802.11 family of specifications.

* * * * *